June 20, 1944.    V. POPOV    2,352,005
WEIGHING APPARATUS
Filed April 5, 1941
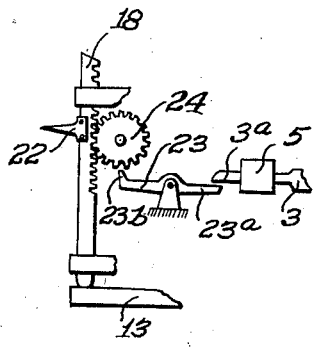
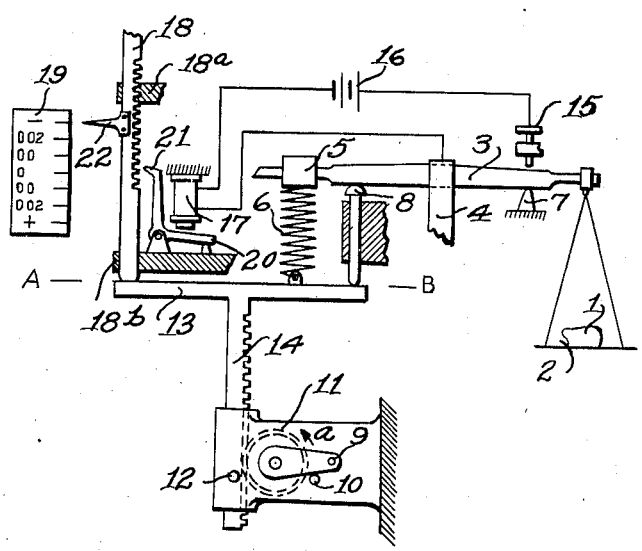
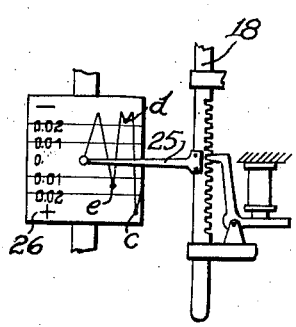
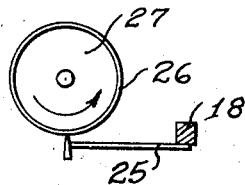
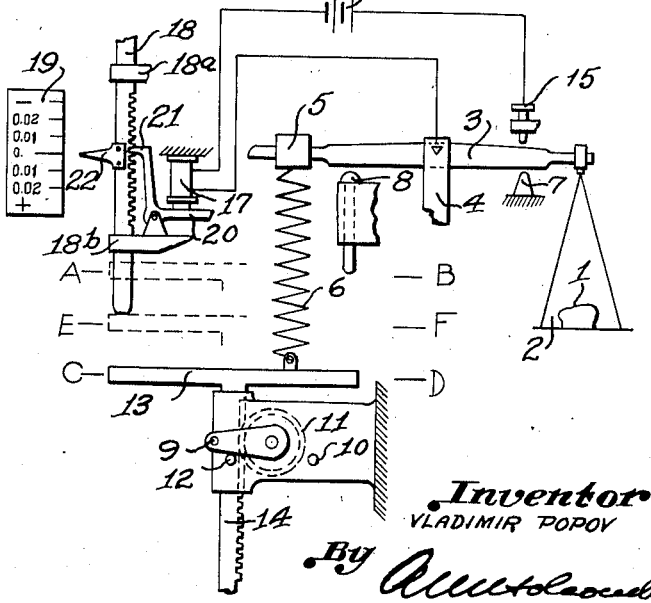
Inventor
VLADIMIR POPOV
By Attorney Patented June 20, 1944

2,352,005

UNITED STATES PATENT OFFICE 2,352,005

WEIGHING APPARATUS

Vladimir Popov, Prague, Bohemia; vested in the Alien Property Custodian

Application April 5, 1941, Serial No. 386,957
In Bohemia and Moravia April 17, 1940

7 Claims. (Cl. 265—63)

My invention relates to apparatus for weighing and sorting articles by weight and it is an object of this invention to provide apparatus of the character referred to capable of carrying out a weighing process which renders possible to ascertain the weight differences of the articles in comparison with a predetermined correct weight.

It is also an object of this invention to provide improved and more sensitive means for grading or sorting the articles by weight, e. g. into three groups: under the weight limit, within the limits allowed and over the limit.

It is a further object to provide means in the said apparatus which enables the operator to record, in a suitable way, the result of every weighing operation effected on the apparatus.

These objects are effected by my invention, as will be apparent from the following description and claims taken in connection with the accompanying drawing in which:

Fig. 1 is a diagrammatic view of a preferred embodiment of the apparatus in arrested position, whereby an electric control is provided, Fig. 2 shows the mechanical control in connection with the apparatus shown in Fig. 1, Fig. 3 shows the same apparatus in the released position and after a finished weighing operation, Fig. 4 illustrates the recording mechanism which operates according to the weight of the measured article, and Fig. 5 shows a detail of the last-named recording mechanism.

To achieve the specified objects of my invention my apparatus comprises a weighbeam which is provided with a scale-pan for the measured articles on one arm and a counterweight on the other arm, and a dynamometric spring serving to ascertain and measure the value of the weight differences i. e. the differences between the correct and the actual weight of the articles. This spring is not sprung but released in the rest position of the apparatus and acts on the weighbeam only by its compression or tension in a positive or negative sense with respect to the counterweight depending on which arm of the beam it is placed. When this spring is stretched during the weighing operation it acts on the beam dynamically within close limits, which correspond approximately to the allowed weight tolerances of the articles.

The dynamometric spring is thus a very fine device which is subjected only to slight stresses within predetermined limits, sufficient for ascertaining the weight differences, so that this spring is not exposed to the full load of the article and its function can be compared with that of a rider used in connection with an ordinary analytic balance.

To achieve a sufficient stability and elasticity of these springs, the same can be made of a thin glass fibre for measurements within the limits of 0.01 gramme, of thin bronze wire from 0.01 up to 0.1 grm. and of thin steel piano-wire over 0.1 grm. The springs made of said materials are so sensitive that great amplitudes are obtained by small loads, e. g. a load of 0.01 grm. can produce a compression or elongation of 3–5 mm., so that the scale shown in the drawing can be considered as being in actual size. This sensitivity is sufficient for ascertaining and recording the weight differences with an accuracy equal to that of an ordinary analytic balance.

The apparatus comprises furthermore means for loading the spring by a force, which is independent of the weighbeam as well as of the weight of the article, this means actuating simultaneously a registration member which, in response to the actual weight of article, indicates and respectively also records the value of the weight differences. The said registration member may be used to operate any suitable known device for sorting the articles by weight, this device being not described in detail in my description.

According to its utilization, my apparatus can be adapted either for mechanical or for hand operation. For the sake of simplicity, the described and illustrated embodiment relates to a hand operated apparatus.

Referring now again to the drawing, the numeral 1 indicates the articles, the weight of which is to be checked and ascertained by the apparatus. These articles are transferred one by one to a scale-pan 2 suspended on the right arm of the weighbeam 3. The correct weight of the articles should be e. g. 3 grammes with the maximum allowed tolerances ±0.02 grm., i. e. the lowest admissible weight is 2.98 grm., the highest 3.02 grm. For this purpose the left arm of the weighbeam 3, which is suspended in the bracket 4, is loaded with a counterweight 5 and with a dynamometric spring 6, which together imposes such a weight that the left arm of the weighbeam is slightly less loaded than the right arm, when an article having the minimum admissible weight, i. e. 2.98 grm. is laid on the scale-pan.

A stationary abutment 7 prevents the weighbeam from swinging in one direction (to the right according to Fig. 1). The oscillations of the weighbeam in the other direction can be effected only after a stop member 8 has been released. This member holds the beam in horizontal position during stoppage and releases the same for oscillation when it is lowered down.

Supposing that the right arm of the weighbeam 3 is loaded by an article having a weight of 2.98 grm. and that the device is released, the weighbeam will remain resting on the abutment 7, as the total of the counterweight 5 and of the weight of the spring 6 is slightly less than 2.98 grm. It is of course assumed that the spring 6 is suspended freely and subject to no force at the moment of releasing of the device.

The arresting and releasing movement of said member 8 is effected by a series of members, which will be described later on.

A gear 11 is connected with a crank handle 9, which, in the arrested position, rests on an abutment 10. After one half of a revolution in the direction a, the handle 9 is stopped by the abutment 12 (Fig. 3). During this rotation, the plate 13, which is rigidly connected to a rack 14, engaging constantly the gear 11, effects a movement from its upper position A—B (Fig. 1) into the lowermost position C—D (Fig. 3). At the same time, the stop member 8 is lowered and the weighbeam is released.

As soon as the weighbeam executes a small swing to the left, the contact of the beam with the abutment 7 is interrupted and, on the other hand, the beam touches a contact-closing screw 15, thereby completing an electric circuit comprising a current-generator 16 and a solenoid 17.

The completion of the circuit can naturally be effected also by other means which will occur to those skilled in the art. Also, in the mechanism described and shown in the drawing, the movement of the rack 14 is obtained by hand, but arrangements for automatic operation of the same can easily be provided by those skilled in the art.

During the positive downwards movement of the plate 13, the dynamometric spring 6 is stretched, automatically and without regard to the weighbeam or to the weight of the measured article, up to a predetermined maximum which is given by the lowest position C—D of the plate 13 (Fig. 3).

In addition to said members 6 and 8, a rod 18 of a registration mechanism cooperates with the plate 13, said rod passing freely through the guides 18a, 18b and resting by its own weight upon the plate 13.

Assume that an article having the exact correct weight of 3 grm. is laid on the scale-pan 2 and that the dynamometric spring 6 is dimensioned in such proportions that a weight of 0.01 grm. produces an elongation corresponding to one point of the scale 19. The registration rod 18 follows the downwards movement of the plate 13, until the electric circuit of the solenoid 17 is completed by the contact-closing screw 15, upon which the lever 20 is shifted by the action of the solenoid 17 into the position according to Fig. 3 and its nose 21 engages a tooth-space of the rack or rod 18, thus hindering its further movement.

If the weight of the article is equal to the correct theoretical weight, the contact of the weighbeam 3 with the screw 15 will be assumed and the movement of the registration rod 18 with the pointer 22 stopped, after this rod has travelled from its upper position, in which the pointer 22 indicates the minus mark against the scale 19, to the position, where the pointer indicates zero on the scale. This moment corresponds to the mid-way position of the plate 13, as denoted by letters E—F in Fig. 3. The plate continues its movement to its lowest position C—D, but the registration rod 18 is held in the arrested position by the nose 21 of the lever 20. The rod is returned to its original position later on during the backward movement of the plate 13 to the position A—B.

An article having the correct weight can be used for checking the correct adjustment of the apparatus and of the dynamometric spring 6. If this spring is correctly dimensioned, the articles of a weight of 3—0.01 grm. will produce the locking of the rod 18 with the pointer 22 standing opposite the 0.01 mark over the zero-line, the articles of 3—0.02 grm. opposite the 0.02 over the zero-line, whilst articles under 3—0.03 grm. will not influence the rod 18 at all, as the arm of the weighbeam loaded by this light article will close the contact with the screw 15 immediately after the release of the apparatus and the registration rod 18 will be blocked by the lever 20 even before it could execute any movement.

The swing of the weighbeam 3 from its position of rest on the abutment 7 into the position of contact with the screw 15 should of course be as small as possible.

If the articles have a weight over 3 grms., e. g. 3.01, 3.02 grm., the rod 18 will be stopped with the pointer 22 standing opposite the corresponding marks 0.01, 0.02 underneath the zero-line of the scale. If the weight of the article exceeds 3.03 grm., the rod will follow the movement of the plate 13 to its lowest position and the pointer 22 will indicate the plus mark of the scale 19.

It is clear, from the above, that for every article having the allowed weight, the registration rod 18 will be stopped with the pointer 22 indicating within the limits of 0.02 over and 0.02 under the zero-line of the scale. For the inadmissible articles under the limit, the pointer 22 will stand over the 0.02 mark and for the inadmissibly heavy articles underneath the 0.02 mark under the zero-line.

It is also clear that the accuracy of the weighing increases in the same measure as the movement of the plate 13 is slower and the gearing of the rod 18 finer.

The electric control of the registration rod 18 can be replaced by mechanical means, as shown in Fig. 2. This figure shows a two-armed lever 23, which cooperates with the weighbeam 3 and blocks the movement of the rod 18 as soon as the weighbeam executes a swing. To effect this, a gear 24 engages the gearing of the rack or rod 18 and the nose 23b of the lever 23 is adapted to engage this gear, when the end 3a of the weighbeam 3 presses down the arm 23a of the lever, the movement of the rod 18 being thus prevented.

The registration rod 18 can be provided with a member 25 which serves to record the movements of the rod 18 during every weighing operation e. g. on a paper band 26 wound on the drum 27, as shown in Figs. 4 and 5.

The drum 27 is rotated by means of a clockwork or similar mechanism, preferably with interruptions in the time of stoppage of the weighbeam. The paper band 26 can be ruled and provided with minus and plus marks and numbers similarly to the scale 19 in previous case.

As the recording member 25 effects, during every weighing operation, a movement downwards and upwards and the drum 27 with the paper band 26 rotates, a curve will be recorded on the band, as shown in Fig. 4. From this curve, the weight of every individual measured article can be ascertained. The point c of the curve shows that the measured article was too heavy, the point d corresponds to an article under the weight limit, the point e to an article of allowed weight and the point f shows that the measured article has the correct theoretical weight.

Having now fully described my invention, I claim:

1. In an apparatus for weighing articles, a weighbeam, a scale-pan for the measured articles on one arm and a counterweight on the other arm of said weighbeam, a dynamometric spring disposed to influence said weighbeam within predetermined limits, a movable member adapted to be moved from one position to another during every weighing operation, said spring being connected to both the weighbeam and movable member so as to be sprung by the movement of the last-named member, a registration member adapted to follow the movement of said movable member, a contact-closing member disposed to complete an electric circuit with the weighbeam as soon as the weight of the article being weighed is offset by the combined action of the counter-weight and spring and an electrically controlled arresting member adapted to block further movement of the registration member upon closing of said circuit.

2. In an apparatus for weighing articles, a weighbeam, a scale-pan for the measured articles on one arm and a counterweight on the other arm of said weighbeam, a dynamometric spring disposed to influence said weighbeam within predetermined limits, a movable member adapted to being moved from one position to another during every weighing operation, said spring being connected to both the weighbeams and movable member so as to be sprung by the movement of the last-named member, a registration member adapted to follow the movement of said movable member, a gear in constant engagement with said registration member and a two-armed lever adapted to cooperate with the weighbeam and to block the last-named gear as soon as the weight of the article being weighed is offset by the combined action of the counter-weight and spring.

3. In an apparatus for weighing articles, a weighbeam, a scale-pan for the measured articles on one arm and a counterweight on the other arm of said weighbeam, a dynamometric spring disposed to influence said weighbeam within predetermined limits, a movable member adapted to be moved from one position to another during every weighing operation, said spring being connected to both the weighbeam and movable member so as to be sprung by the movement of the last-named member, a registration member adapted to follow the movement of said movable member, an arresting member operable under the influence of the weighbeam and capable of arresting the registration member as soon as the weight of the article being weighed is offset by the combined action of the counter-weight and spring, a pointer on the registration member and a scale with numbering corresponding to the weight values, including the grade of the load of the dynamometric spring.

4. In an apparatus for weighing articles, a weighbeam, a scale-pan for the measured articles on one arm and a counterweight on the other arm of said weighbeam, a dynamometric spring disposed to influence said weighbeam within predetermined limits, a movable member adapted to be moved from one position to another during every weighing operation, said spring being connected to both the weighbeam and movable member so as to be sprung by the movement of the last-named member, a registration member adapted to follow the movement of said movable member, an arresting member operable under the influence of the weighbeam and arranged to arrest further movement of the registration member as soon as the weight of the article being weighed is offset by the combined action of the counter-weight and spring, a movable band of paper adjacent the registration member, and a recording member connected to said registration member and arranged to record the movements of the registration member on said movable band of paper.

5. In a weighing apparatus, means to determine the extent of excess of deficiency in weights of a series of similar articles above or below a desired weight, comprising a weighbeam, a scale-pan pivotally mounted on one arm and a counter-weight mounted on another arm of said weighbeam to offset the major portion of the desired weight of each article placed on the scale-pan, a movable member adapted to be moved from one position to another during each weighing operation, a light spring arranged between said movable member and the arm of the weighbeam carrying the counter-weight and adapted upon movement of said movable member to supplement the weight offsetting capacity of said counter-weight, an indicating chart, a registration member carrying a pointer co-operating with said indicating chart and adapted to follow the movement of said movable member, an electrically controlled arresting member adapted to block further following movement of said registration member when the weight of an article on the scale-pan has been offset, and means for actuating said arresting member as soon as the weight of an article on the scale-pan has been offset.

6. A weighing apparatus as recited in claim 5, wherein the registration member is held in position by said movable member whereby the pointer will indicate less than a permissible variation of the desired weight of each article prior to movement of such movable member, and moves across the indicating chart after movement of such movable member toward a position indicating a greater weight than permissible allowance over such desired weight.

7. A weighing apparatus as recited in claim 5, wherein the weighbeam is held against swinging movement until said movable member is moved.

VLADIMIR POPOV.

CERTIFICATE OF CORRECTION.

Patent No. 2,352,005.　　　　　　　　　　　　　　　　　June 20, 1944.

VLADIMIR POPOV.

It is hereby certified that error appears in the printed specification of the above numbered patent requiring correction as follows: Page 3, second column, line 31, claim 5, for the word "of" second occurrence, read --or--; and that the said Letters Patent should be read with this correction therein that the same may conform to the record of the case in the Patent Office.

Signed and sealed this 22nd day of August, A. D. 1944.

(Seal)

Leslie Frazer
Acting Commissioner of Patents.